(12) United States Patent
King

(10) Patent No.: US 11,123,948 B2
(45) Date of Patent: Sep. 21, 2021

(54) METHOD FOR FORMING A COMPOSITE STRUCTURE

(71) Applicant: Epic Aircraft, LLC, Bend, OR (US)

(72) Inventor: Douglas King, Bend, OR (US)

(73) Assignee: Epic Aircraft, LLC, Bend, OR (US)

( * ) Notice: Subject to any disclaimer, the term of this patent is extended or adjusted under 35 U.S.C. 154(b) by 0 days.

(21) Appl. No.: 16/683,174

(22) Filed: Nov. 13, 2019

(65) Prior Publication Data

US 2020/0147922 A1    May 14, 2020

Related U.S. Application Data

(60) Provisional application No. 62/760,733, filed on Nov. 13, 2018.

(51) Int. Cl.

| | |
|---|---|
| *B32B 3/12* | (2006.01) |
| *B32B 7/12* | (2006.01) |
| *B32B 37/26* | (2006.01) |
| *B32B 38/00* | (2006.01) |
| *B32B 37/10* | (2006.01) |

(Continued)

(52) U.S. Cl.
CPC .............. *B32B 3/12* (2013.01); *B32B 7/12* (2013.01); *B32B 37/1018* (2013.01); *B32B 37/146* (2013.01); *B32B 37/26* (2013.01); *B32B 38/0012* (2013.01); *B29C 65/4835* (2013.01); *B29C 66/0224* (2013.01); *B29C 66/7254* (2013.01); *B29C 70/683* (2013.01); *B32B 3/30* (2013.01); *B32B 2038/0016* (2013.01); *B32B 2038/047* (2013.01); *B32B 2305/024* (2013.01);

(Continued)

(58) Field of Classification Search
CPC ......... B32B 3/12; B32B 37/26; B32B 37/146; B32B 37/1018; B32B 38/0012; B32B 38/04; B32B 2037/1253; B32B 2038/0016; B32B 2038/047; B32B 2305/024; B32B 2605/18; B32B 3/266; B32B 3/30; B32B 2607/00; B29C 37/0082; B29C 65/00; B29C 65/48; B29C 65/4835; B29C 66/022; B29C 66/0224; B29C 66/7254; B29C 70/088; B29C 70/44; B29C 70/683; Y02T 50/40; B29D 24/005
USPC ... 156/60, 87, 153, 250, 252, 253, 285, 286, 156/290, 292; 428/116, 118, 131, 134, 428/136, 137, 192, 194; 52/793.1, 52/793.11; 181/288, 292
See application file for complete search history.

(56) References Cited

U.S. PATENT DOCUMENTS

| | | | | |
|---|---|---|---|---|
| 3,769,767 A | * | 11/1973 | Scott ..................... | E04C 2/365 52/145 |
| 4,001,473 A | * | 1/1977 | Cook ..................... | B32B 3/12 428/116 |

(Continued)

FOREIGN PATENT DOCUMENTS

| | | | | | |
|---|---|---|---|---|---|
| GB | 1463918 A | * | 2/1977 | ............... | F02C 7/24 |
| GB | 2122540 A | * | 1/1984 | ............. | B32B 15/18 |

*Primary Examiner* — Philip C Tucker
*Assistant Examiner* — Brian R Slawski
(74) *Attorney, Agent, or Firm* — McCoy Russell LLP

(57) ABSTRACT

Methods and systems are provided for fabricating a composite structure. In one example, the composite structure may include a honeycomb core sandwiched between face sheets. An edge of the honeycomb core may be abraded and a top face sheet may be perforated. As such, a likelihood of delamination of the composite structure during a curing step may be reduced.

18 Claims, 12 Drawing Sheets

(51) Int. Cl.
  *B32B 37/14*   (2006.01)
  *B32B 38/04*   (2006.01)
  *B64C 1/00*    (2006.01)
  *B29C 65/00*   (2006.01)
  *B29C 65/48*   (2006.01)
  *B29C 70/68*   (2006.01)
  *B32B 3/30*    (2006.01)
(52) U.S. Cl.
  CPC ... *B32B 2605/18* (2013.01); *B64C 2001/0072* (2013.01)

(56) References Cited

U.S. PATENT DOCUMENTS

| | | | | |
|---|---|---|---|---|
| 4,094,717 | A * | 6/1978 | Barr | F24S 70/60 156/197 |
| 4,251,579 | A * | 2/1981 | Lee | A62C 35/00 428/73 |
| 5,000,998 | A * | 3/1991 | Bendig | B32B 3/12 156/153 |
| 5,651,850 | A | 7/1997 | Turner et al. | |
| 6,122,892 | A * | 9/2000 | Gonidec | F02K 1/822 52/793.1 |
| 2002/0036115 | A1* | 3/2002 | Wilson | F02C 7/045 181/292 |
| 2005/0147790 | A1* | 7/2005 | Levavasseur | E04C 2/328 428/116 |
| 2005/0178489 | A1* | 8/2005 | Belleguic | G10K 11/172 156/64 |
| 2005/0199514 | A1* | 9/2005 | Sutherland | B65D 71/20 206/170 |
| 2006/0289232 | A1* | 12/2006 | Muller | G10K 11/168 181/292 |
| 2008/0277531 | A1 | 11/2008 | Ackermann et al. | |
| 2009/0072086 | A1 | 3/2009 | Smith et al. | |
| 2009/0252921 | A1* | 10/2009 | Bottler | B29C 70/443 428/116 |
| 2010/0310820 | A1* | 12/2010 | Wiegersma | E04C 2/365 428/116 |
| 2013/0299274 | A1* | 11/2013 | Ayle | B32B 3/12 181/292 |
| 2015/0086335 | A1* | 3/2015 | Merlo | B64C 1/40 415/119 |
| 2018/0166058 | A1* | 6/2018 | Delehouze | C25D 11/246 |

* cited by examiner

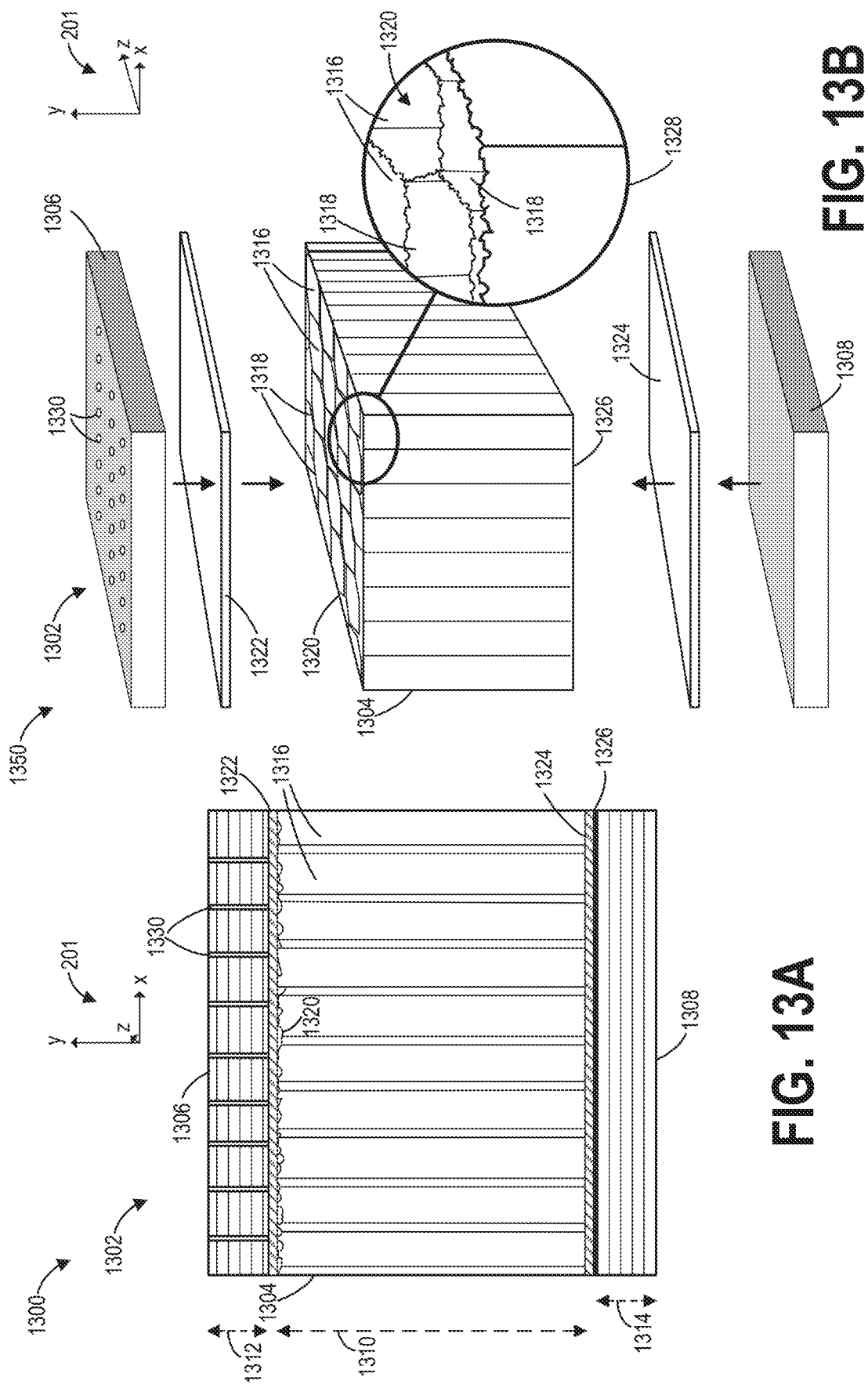

METHOD FOR FORMING A COMPOSITE STRUCTURE

CROSS REFERENCE TO RELATED APPLICATIONS

The present application claims priority to U.S. Provisional Application No. 62/760,733, entitled "A METHOD FOR FORMING A COMPOSITE STRUCTURE," filed Nov. 13, 2018. The entire contents of the above-identified application are hereby incorporated by reference for all purposes.

FIELD

The present description relates generally to methods and systems for forming a composite structure.

BACKGROUND AND SUMMARY

Flight has become a common, and in some cases, nearly day-to-day mode of transportation since the introduction of commercial aircrafts to the U.S. during the early 1900s. Over the last century of airborne travel, aerospace technology has seen tremendous advances, especially with regards to development of new materials for aircrafts. The manufacturing of such materials has allowed for significant reductions in aircraft weight, thereby providing considerable improvements to fuel efficiency and performance.

Bodies, or fuselages, of modern aircrafts are formed from hybrid composite structures that have high temperature tolerance and high strength-to-weight ratios. The composite structures may be sandwich-like arrangements of a core material with a honeycomb structure between arranged layers of prepregnated (prepreg) material, or face sheets, arranged on opposite faces of the honeycomb core. The honeycomb structure may be formed from a lightweight composite material such as carbon-fiber reinforced plastic or an expanded metal and configured as a network of hollow cells divided and linked by cell walls. The surrounding face sheets, comprising layers of prepreg material may include plies of resin-impregnated fiberglass cloth or prepreg graphite and be configured to carry in-plane shear loading while provide bending and in-plane shear stiffness to the composite structure. The sandwich structure may be subjected to high temperatures to cure the resin incorporated in the face sheets and lend rigidity to the structure.

The honeycomb core may be attached to the prepreg material, or face sheets, by layers of adhesive film. The adhesive film securely bonds the edges of the honeycomb core to the surfaces of the face sheets and does so over a relatively small surface area due to the structure of the honeycomb core. For example, Smith et al. in U.S. 2009/0072086 teaches a composite structure with a core material bonded to an interior surface of a face sheet with an adhesive composed of polyamide and/or rubber. The core material of the composite structure of U.S. 2009/0072086 may be cut from a large block of honeycomb material, resulting in "ragged" or uneven edges that may be difficult to secure to the face sheets. Thus, the honeycomb core is treated by sanding, machining, etc., to smooth the edges. Improved adhesion between the honeycomb core and face sheets is achieved as a result.

However, the inventors herein have recognized potential issues with such systems. As one example, the bonding of the smooth honeycomb core edges to the face sheets in a thick core composite structure may effectively trap and seal air within the cells of the honeycomb core. Upon exposure to high temperature during curing, the trapped air may expand, causing delamination and/or disbonding between the honeycomb core and at least one of the face sheets thus degrading a structural integrity of the composite structure. Frequent episodes of delamination may incur additional costs to the manufacturing of fuselages and decrease production throughput.

In one example, the issues described above may be addressed by a composite structure comprising a honeycomb core with a treated upper edge and a non-treated bottom edge, the bottom edge on an opposite side of the honeycomb core from the upper edge, a top face sheet coupled to the upper edge of the honeycomb core, and a bottom face sheet coupled to the bottom edge of the honeycomb core.

As one example, the composite structure may include the honeycomb core with an abraded upper edge. Abrasion of the upper edge of honeycomb core may be adjusted to yield an edge that is smooth enough to provide sufficient surface area for secure adhesion of the honeycomb core to the top face sheet yet rough enough that the upper edge does not seal off cells of the top face sheet and inhibit exchange of air between the cells. Bonding the roughened upper edge of the honeycomb core to the face sheet with a layer of adhesive maintains tiny gaps between the upper edge and a surface of the face sheet without significantly reducing the surface area available for adhesive bonding. The face sheet may be perforated with a predetermined uniform pattern to vent inner cells of the honeycomb core during heating. A desired strength of the composite structure is thus provided and a likelihood of delamination is decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 13A shows a schematic cross-section of a composite structure.

FIG. 13B shows an exploded perspective view of a composite structure.

FIGS. 1-8 are shown approximately to scale.

DETAILED DESCRIPTION

Figure 1:
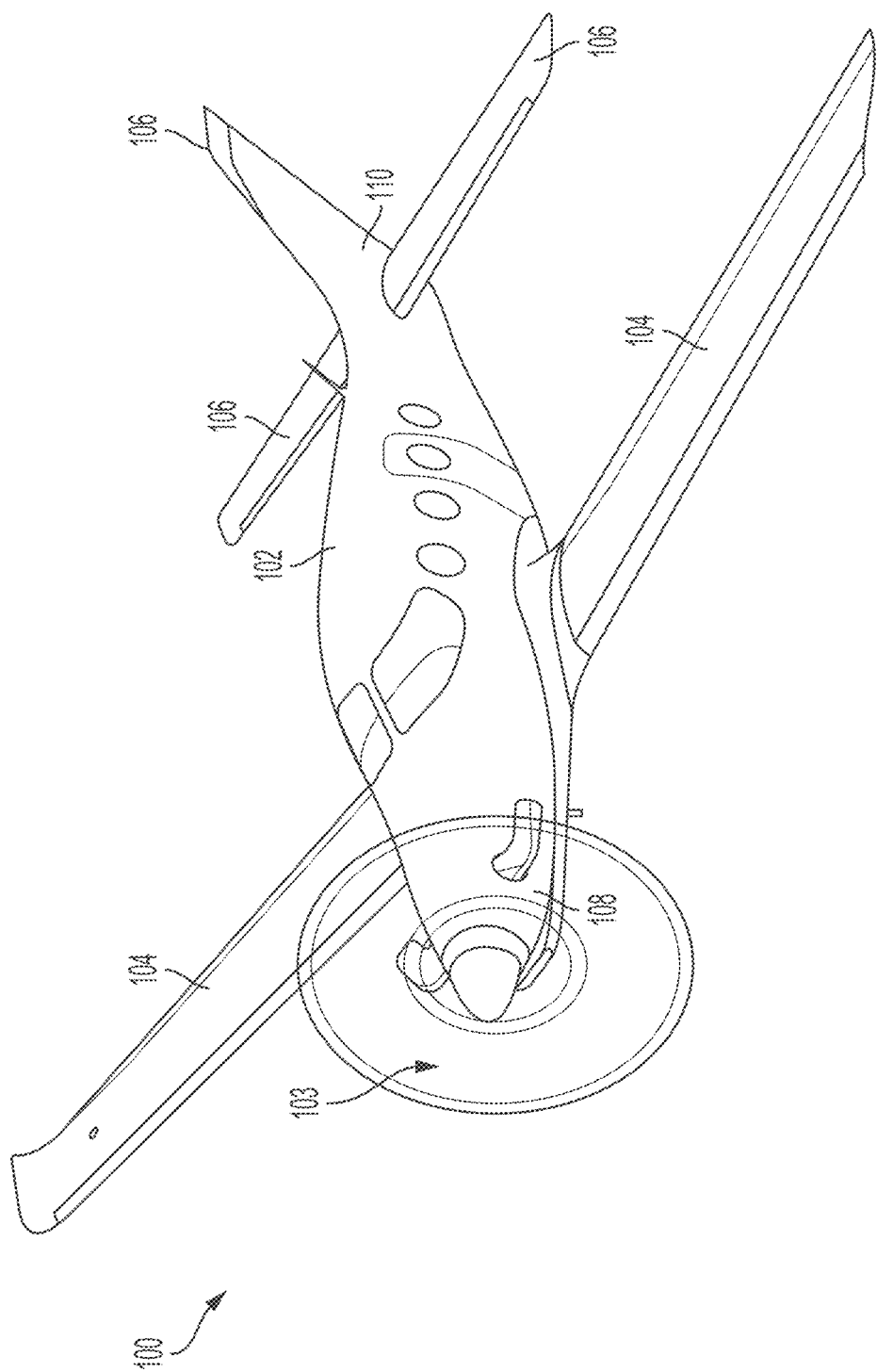
FIG. 1 is an example of an aircraft with a fuselage formed from a composite structure.
Figure 2:
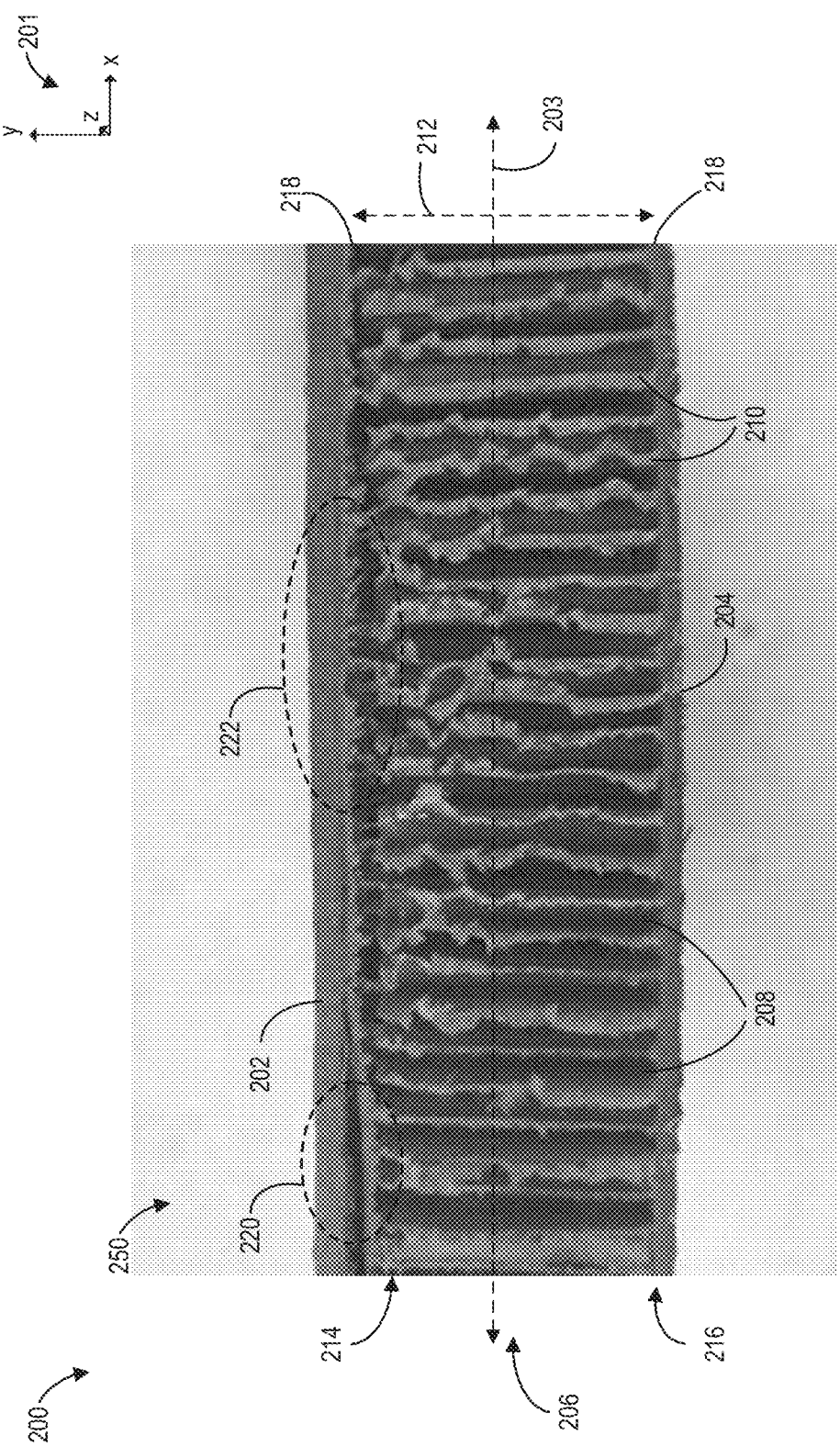
FIG. 2 is cross-section of an embodiment of a composite structure.
Figure 3:
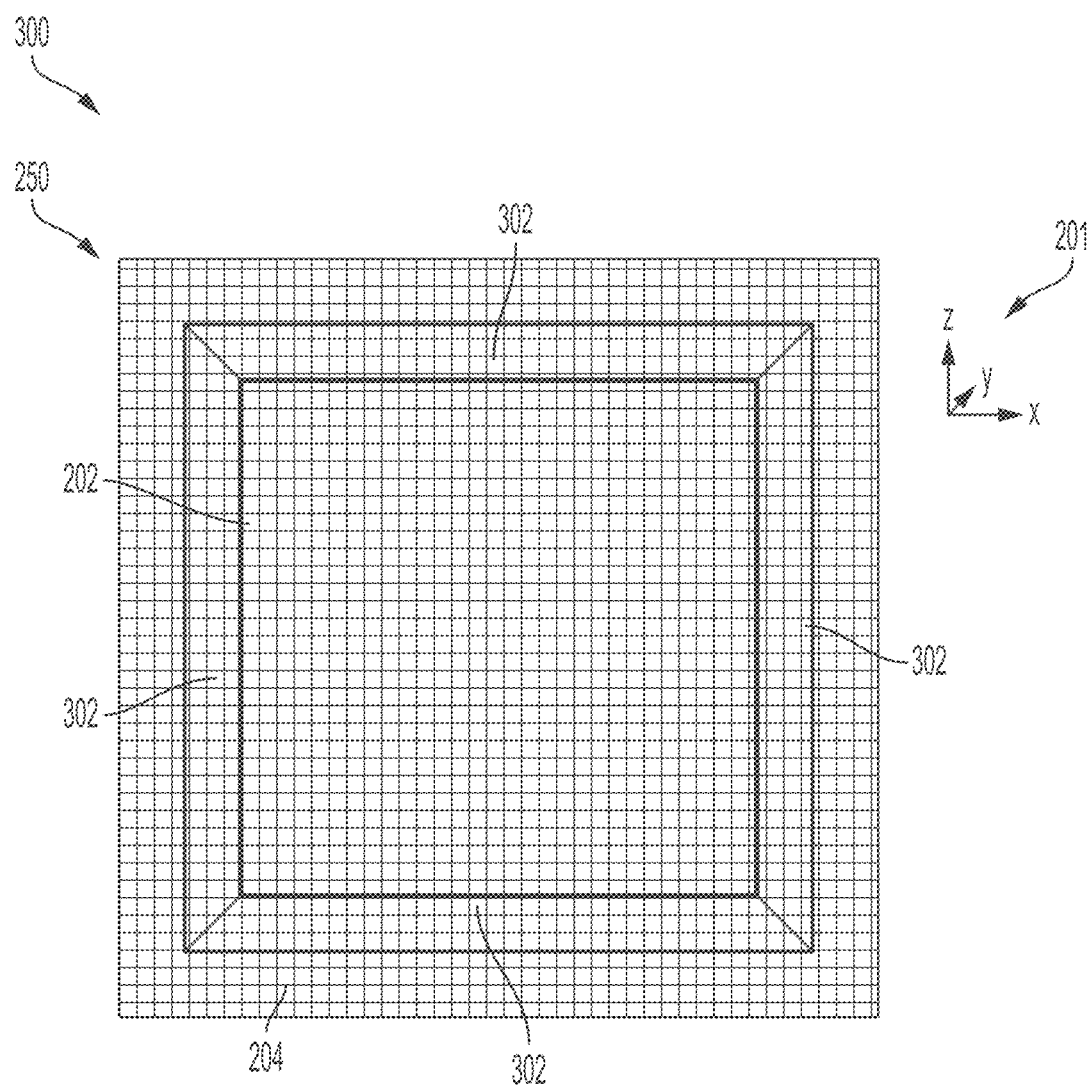
FIG. 3 shows a top surface of an assembled composite test panel.
Figure 4:
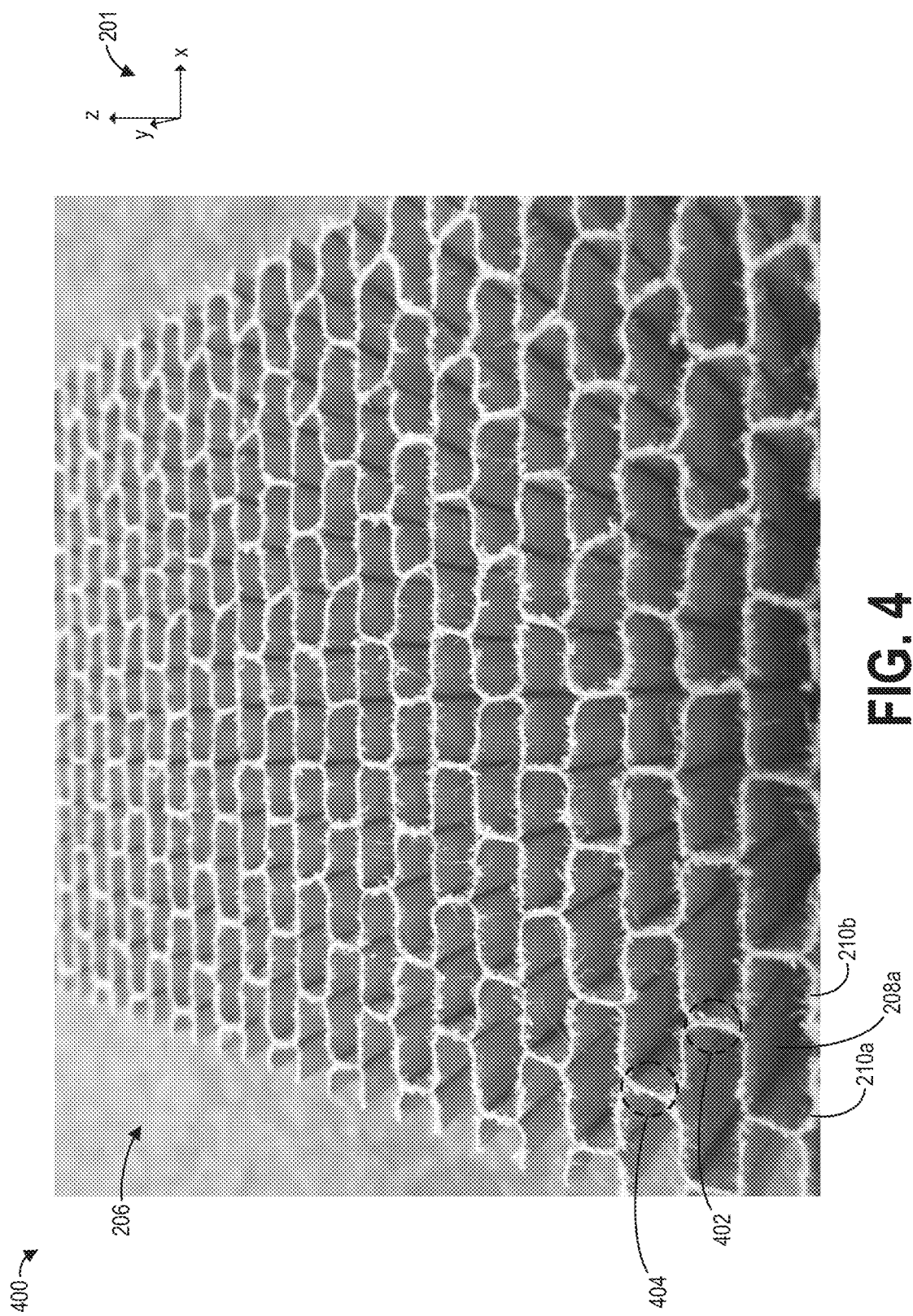
FIG. 4 shows a perspective view of an upper edge of a honeycomb core that may be included in a composite structure.
Figure 5:
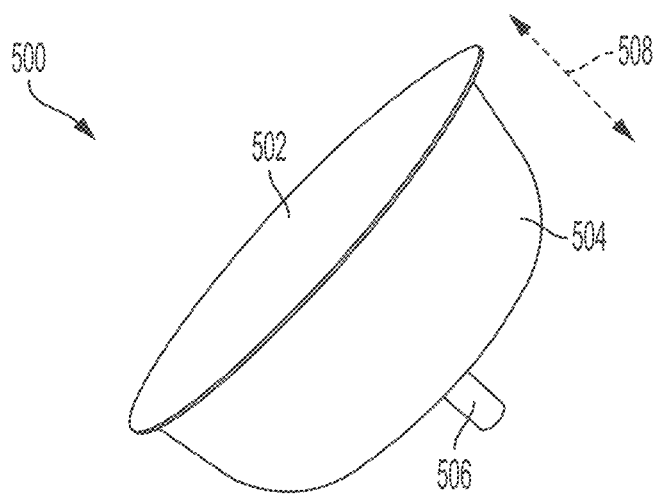
FIG. 5 shows an example of a sanding tool used to treat an edge of a honeycomb core of a composite structure.
Figure 7:
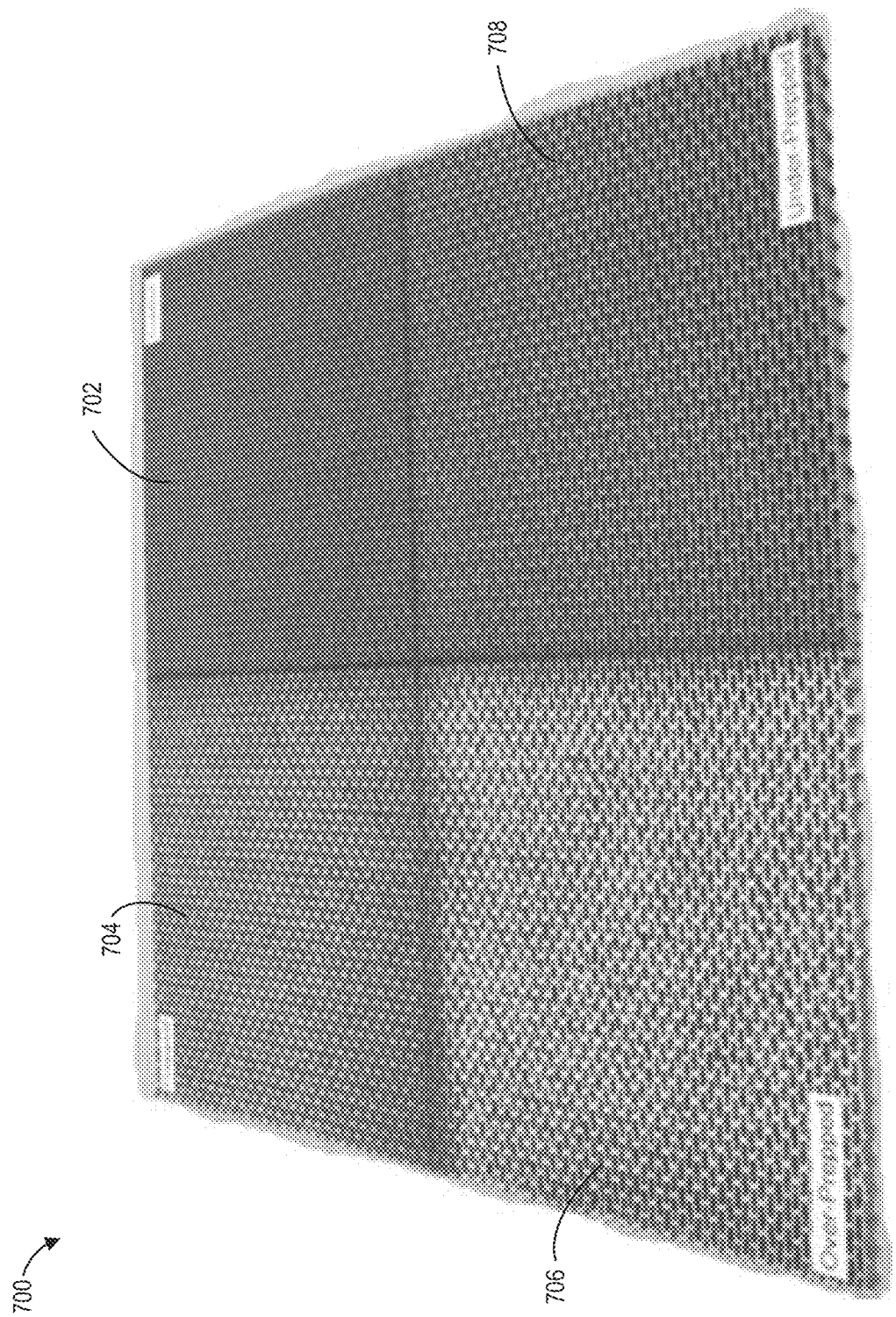
FIG. 7 shows examples of treated honeycomb cores comparing different amounts of roughening from a perspective view.
Figure 8:
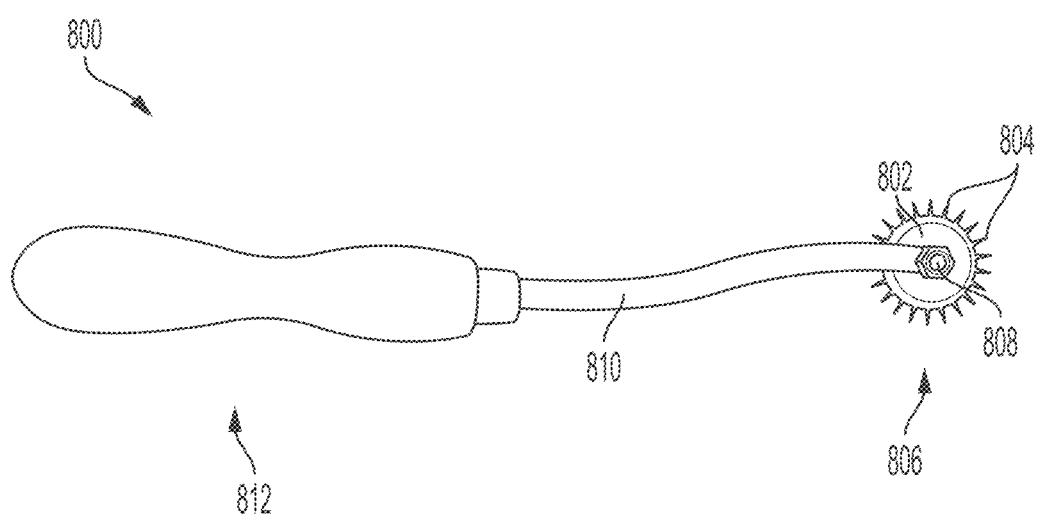
FIG. 8 shows an example of a puncturing tool that may be used to perforate a top face sheet of a composite structure.

The following description relates to systems and methods for forming a thick core composite structure. The composite structure may be used to form the fuselage of a small aircraft. An example of such an aircraft is shown in FIG. 1. A cross-section of an embodiment of the composite structure, depicting a sandwich-like arrangement of face sheets and a honeycomb core, is shown in FIG. 2. A test panel of the composite structure, fully assembled and including the face sheets, is depicted in FIG. 3. The honeycomb core, without the surrounding face sheets, is shown from a perspective view in FIG. 4. FIG. 5 shows an example of a sanding tool that may be used to treat an upper edge of the honeycomb core to allow air flow between cells of the honeycomb core. A plot of an amount of material removed from the upper edge with respect to number of passes of a sanding tool over the honeycomb core is given in FIG. 6. Sections of the honeycomb core subjected to various degrees of sanding are compared in FIG. 7. An example of a perforation tool that may be used to treat a face sheet of the composite structure to alleviate pressure generated inside the composite structure during heating is shown in FIG. 8. FIGS. 9-12 show graphs depicting temperature and pressure plotted relative to time for each of a control panel (no core sanding and no top face sheet perforations), a panel with a hand-sanded honeycomb core, a panel with a machine-sanded honeycomb core and a top face sheet, and a panel with a machine-sanded honeycomb core and a perforated top face sheet. The panels described in FIGS. 9-12 may be formed from the composite structure. FIGS. 13A and 13B depict a composite structure, shown in a schematic cross-section in FIG. 13A and in an exploded perspective view in FIG. 13B to illustrate details of interfaces between layers of the composite structure. Microscope images of cross-sections of the control panel and a treated panel of the composite structure are compared in FIGS. 14 and 15, respectively, to show differences in adhesion of the panels after processing. An exemplary routine for forming the thick core composite structure is provided in FIG. 16.

FIGS. 1-8, 13A-15 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Weight reduction is a continual goal in the aerospace industry which has led to an incorporation of composite materials in aircraft structures. Composites are hybrid materials with improved structural properties arising from the combination of more than one type of material. Fiberglass, carbon fiber, fiber-reinforced matrix systems are a few examples of composites that have become popular materials for a variety of transport vehicles.

Modern aircrafts, such as airplanes and helicopters, may be composed largely of composite materials. An example of an aircraft 100 is shown in FIG. 1 with an outer housing that includes a fuselage 102, wings 104, and stabilizers 106. The fuselage 102 forms a body of the aircraft 100 and is an elongate chamber, capped at a front end 108 by a rounded protruding wall, or nose, containing a cockpit and coupled to a propeller 103. The fuselage 102 may taper at a rear end 110 that is coupled to the stabilizers 106. The aircraft 100 may be a turboprop-driven airplane, configured to operate with greater fuel efficiency compared to a turbojet-driven airplane and may be used as a small commuter aircraft. A largest structural portion of the aircraft 100 is formed by the fuselage 102, hence a weight of the fuselage 102 may greatly impact a fuel consumption of the aircraft 100. By forming the fuselage from composite materials, an overall weight of the aircraft 100 as well as degradation of exterior surfaces of the aircraft 100 over time may be reduced.

An example of a composite structure 1302 that may be used to form a component that includes an inner core with a low overall density, is shown in a cross-section 1300 and an exploded view 1350 in FIGS. 13A and 13B. The composite structure 1302 may be applied to formation of aircraft fuselages or other structural parts where a balance between tensile strength and light weight is desirable. A set of reference axes 201 is provided, indicating a y-axis, x-axis, and z-axis. The composite structure 1302 may be included in a fuselage of a small turboprop airplane, such as the aircraft 100 of FIG. 1, or various other aircrafts in which a lightweight fuselage is desirable. An interface between a core of the composite structure 1302 and a top face sheet may be treated to decrease a likelihood of delamination, as discussed further below.

The cross-section 1300 of FIG. 13A shows a sandwich structure including a thick honeycomb core 1304 coupled to a top face sheet 1306 and a bottom face sheet 1308 arranged on opposite edges of the honeycomb core 1304. The top face sheet 1306 and the bottom face sheet 1308 may be formed from a variety of prepreg composite materials, including carbon, glass, aramid fibers, etc. The honeycomb core 1304 is has a much greater thickness 1310 than a thickness 1312 of the top face sheet 1306 or a thickness 1314 of the bottom face sheet 1308. In one example, the thickness 1312 of the top face sheet 1306 may be equal to the thickness 1314 of the bottom face sheet 1308 but may not be equal in other examples. Materials from which the top and bottom face sheets 1306, 1308, and the honeycomb core 1304 may be formed will be described further below with reference to FIG. 2.

An internal structure of the honeycomb core 1304 is shown in the exploded view 1350 of FIG. 13B. The honeycomb core 1304 may include hollow chambers 1316, or cells 1316, that extend along the thickness 1310 of the honeycomb core 1304. Each of the cells 1316 are surrounded by cell walls 1318 and each cell enclosed by cell walls 1318 may have a hexagonal shape when viewed along the y-axis. However, other geometries of the cells 1316 and cell walls 1318, such as oval, rectangular, pentagonal, etc., have been contemplated.

An upper edge 1320 of the honeycomb core 1304 may be in face-sharing contact with a bottom surface of a first layer of adhesive 1322. Further description of the first layer of adhesive 1322, as well as a second layer of adhesive 1324, will be provided with reference to FIG. 2. An upper surface of the first layer of adhesive 1322 may be in face-sharing contact with a bottom surface of the top face sheet 1306 and bonds the upper edge 1320 of the honeycomb core 1304 to the top face sheet 1306. Similarly, an upper surface of the second layer of adhesive 1324 may be in face-sharing contact with a lower edge 1326 of the honeycomb core 1304. A lower surface of the second layer of adhesive 1324 may be in face-sharing contact with an upper surface of the bottom face sheet 1308, thereby bonding the bottom face sheet 1308 to the lower edge 1326 of the honeycomb core 1304.

The upper edge 1320 of the honeycomb core 1304 is shown in FIGS. 13A and 13B after treatment to impart the upper edge 1320 with a desired texture. Specifically, the upper edge 1320 is roughened so that the upper edge 1320 is uneven, e.g., not smooth, and does not sealingly engage with the first layer of adhesive 1322. Instead, as depicted in an expansion 1328, the upper edge 1320 of the honeycomb core 1304 has a coarse, irregular texture. The irregular texture of the upper edge 1320 includes a plurality of hills and valleys relative to the y-axis, across the z-x plane. For example, portions of the upper edge 1320 may extend upwards to form hills, slopes, ridges that are asymmetric about the y-axis and other portions of the upper edge 1320 may have valleys, slopes, and dips that extend downwards and are also asymmetric about the y-axis. The upper edge 1320 may have fibers of material of uneven heights, with respect to the y-axis, with a jagged geometry that varies in a non-uniform manner along the z-x plane and does not show any symmetry along any axis.

As a result of the texture of the upper edge 1320 of the honeycomb core 1304, gaps are formed between the upper edge 1320 and the first layer of adhesive 1322, as shown in FIG. 13A. The first layer of adhesive 1322 may be at least semi-rigid, maintaining a flat, smooth lower surface. When coupled to the upper edge 1302, the first layer of adhesive 1322 may contact the taller portions of the upper edge 1302, e.g., the hills and ridges, and not the shorter portions of the upper edge 1302, e.g., the valleys and dips. Air in one of the cells 1316 of the honeycomb core 1304 may flow through the gaps between the first layer of adhesive 1322 and the upper edge 1302 into one or more adjacent cells 1316, allowing fluidic coupling of the cells 1316 to one another. Upon heating during a curing step, the adhesive may melt and flow into the gaps, thereby sealing the gaps and blocking air flow between cells 1316.

In contrast, the lower edge 1326 of the honeycomb core 1304 is untreated and has a smooth, even geometry across the z-x plane. The smooth lower edge 1326 may couple to the second layer of adhesive 1324 so that there are no gaps between the lower edge 1326 and the second layer of adhesive 1324. Exchange of air between the cells 1316 via an interface of the lower edge 1326 and the second layer of adhesive 1324 is inhibited by a sealing engagement between the lower edge 1326 and the second layer of adhesive 1324.

Furthermore, the top face sheet 1306 may be configured with a plurality of perforations 1330. The plurality of perforations 1330 may be holes extending through the entire thickness 1312 of the top face sheet 1306. At least one perforation of the plurality of perforations 1330 may be positioned directly above one of the cells, fluidically coupling air within the cells 1316 to air external to the composite structure 1302. It will be appreciated that the plurality of perforations 1330 as well as the gaps between the first layer of adhesive 1322 and the upper edge 1320 of the honeycomb core 1304 may be depicted at a magnified scale in FIGS. 13A and 13B relative to dimensions of the composite structure 1302 for illustrative purposes. Details of the treatment of the upper edge 1320 of the honeycomb core 1304 and the generation of the plurality of perforations will be elaborated in the figure descriptions below.

A cross-section 200 of an embodiment of a composite structure 250 that may be used to form an aircraft fuselage is shown in FIG. 2. In one example, the composite structure 250 may have similar stacked layers as the composite structure 1302 of FIGS. 13A-13B but an upper edge of a honeycomb core of the composite structure 250 is not roughened. The composite structure 250, when shown in the cross-section 200 of FIG. 2, may be substantially rectangular with a central axis 203 aligned with the x-axis. In some examples, the composite structure 250 may be mirror-symmetric about the central axis 203 and have a thick core structure with a sandwich-like arrangement of layers. An upper layer of the composite structure 250 may be a top face sheet 202 that is co-planar with an x-z-plane and may be formed from stacked plies of prepreg carbon fiber or fiber-glass cloth, the plies of prepreg material also co-planar with the x-z plane. A bottom layer of the composite structure 250 may be a bottom face sheet 204, also co-planar with the x-z-plane, parallel with the top face sheet 202 and also formed from stacked layers of prepreg material. The top face sheet 202 and bottom face sheet 204 may be arranged on opposite sides of a honeycomb core 206, as shown in FIG. 4, positioned in between the top and bottom face sheets 202, 204.

A top view of a panel 300 of the composite structure 250 of FIG. 2 is shown in FIG. 3. Elements of FIGS. 3 and 4 that are in common with those of FIG. 2 are similarly numbered. The panel 300 is square and the top face sheet 202 forms a smaller square centered on top of the bottom face sheet 204. The top face sheet 202 is coupled to the bottom face sheet 204 by side walls 302, extending from edges of the top face sheet to an upper surface of the bottom face sheet 204. The side walls 302 may be angled with respect to the y-axis and may sealingly couple the top face sheet 202 to the bottom face sheet 204 so that air inside the cored composite structure 250 is not fluidly coupled to air outside of the composite structure.

The side walls 302, top face sheet 202, and bottom face sheet 204 may all be formed from a same material. The material comprises fibers that are woven so that surfaces of the side walls 302, top face sheet 202, and bottom face sheet 204 have a checkered appearance, e.g. composed of many squares. It will be appreciated that the panel 300 shown in FIG. 3 is a non-limiting example and materials with other surface patterns, textures, and compositions have been envisioned.

The panel 300 of the composite structure includes the honeycomb core enclosed by the top face sheet 202, bottom face sheet 204 and side walls 302. Turning back to FIG. 2, the honeycomb core 206 may comprise a plurality of cells 208 within a structure of the honeycomb core 206 that are separated by cell walls 210. The cell walls 210 may be formed from carbon-fiber reinforced plastic or some other type of composite. A thickness 212 of the honeycomb core is much greater than a thickness of the top face sheet 202 and the bottom face sheet 204, the thicknesses measured along the y-axis. In other examples, however, the thickness 212 of the honeycomb core may vary with respect to the thicknesses of the top face sheet 202 and the bottom face sheet 204. For example, the thickness 212 of the honeycomb core may be equal to the thickness of the bottom face sheet 204. It should be appreciated that the thickness of the honeycomb core may vary based on application.

The cells 208 and cell walls 210 may be aligned perpendicular to the top and face sheets 202, 204. The cell walls 210 may be thinner, defined along the x-axis, than thicknesses, defined along the y-axis, of the top and bottom face sheets 202, 204 while the cells 208 may be wider, defined along the x-axis, than thicknesses of the top and bottom face sheets 202, 204.

The cell walls 210 may be parallel, of equal thicknesses and spaced evenly apart. The cell walls 210 may be continuous sheets of composite material arranged in a sinuous pattern, as shown in FIG. 4. The honeycomb core 206 is depicted with the top and bottom face sheets and shown from a perspective view 400. A first cell wall 210a has a sinuous pattern that winds back and forth along the x-axis while extending along the z-axis. A second cell wall 210b, adjacent to the first cell wall 210a, has a similar but oppositely oriented sinuous pattern. Specifically, when first cell wall 210a curves to the left, the second cell wall 210b curves to the right. At portions of the first cell wall 210a that are aligned with the z-axis, the first cell wall 210a alternates between face sharing contact with a portion of the second cell wall 210b that is also aligned with the z-axis, as shown in dashed circle 402, and face sharing contact with a portion of another adjacent cell wall on the opposite side of the first cell wall 210a from the second cell wall 210b, as shown in dashed circle 404.

The cells 208 are formed from spaces enclosed by two cell walls. For example, a first cell 208a is constrained by first cell wall 210a at a left side and by second cell wall 210b at a right side, each cell wall forming half of the partitioning around cell first 208a. The highly porous structure, e.g., formed from many air-filled cells, of the honeycomb core 206 allows a mass of the honeycomb core 206 to be light relative to a strength of the honeycomb core 206 in comparison with other materials such as aluminum. When securely attached to the top and bottom face sheets 202, 204 of FIG. 2, the resulting composite structure, e.g., the composite structure 250 of FIG. 2, may provide a sealed, strong, lightweight panel that may be fabricated with a desired curvature or geometry.

Returning to FIG. 2, the honeycomb core 206 may be positioned between the top and bottom face sheets 202, 204 with upper edges 214 of the cell walls 210, hereafter an upper edge 214 of the honeycomb core 206, coupled to a bottom-facing surface of the top face sheet 202. Lower edges 216 of the cell walls, hereafter a lower edge 216 of the honeycomb core 206, may be coupled to a top-facing surface of the bottom face sheet 204. Layers of a film adhesive 218 may be arranged between the top face sheet 202 and the upper edge 214 of the honeycomb core 206 as well as between the bottom face sheet 204 and the lower edge 216 of the honeycomb core 206. The film adhesive 218 may be epoxy, polyamide or bismaleimide chemistry, or some other type of compatible bonding material.

The composite structure 250, when assembled as shown in FIG. 2, may be bagged and placed under vacuum for a period of time to remove air from the cells 208 before undergoing a thermal process to cure the film adhesive 218 and the resins impregnated in the prepreg materials of the top and bottom face sheets 202, 204. During the heating process, delamination between the components of the composite structure 250 may occur. For example, as shown by dashed circle 220, the film adhesive 218 may detach from the top face sheet 202, leaving a gap therebetween. Separation between the film adhesive 218 and the upper edge 214 of the honeycomb core 206, shown by dashed circle 222 may also occur upon exposure to heat. The delamination of the composite structure 250 reduces a structural integrity of the composite structure 250 and use of degraded composite structures in fuselages is undesirable.

Detachment between layers of the composite structure may be due to complete sealing of the cells 208 of the untreated, e.g., not roughened, honeycomb core 206 during exposure to heat. Pressure within the untreated honeycomb core 206 at ambient temperature may be at atmospheric pressure. When heated, air trapped within each of the sealed cells 208 may expand and pressure within the sealed cells 208 may rise until a critical pressure is attained. At the critical pressure, the top face sheet 202 to may lift up and disbond.

A likelihood of air becoming sealed and trapped within the cells 208 prior to heating may be decreased by perforating the face sheets and an effectiveness of the perforations may be enhanced by core abrasion. In other words, the perforations may reduce the pressure inside the cells 208 of the honeycomb core 206 to prevent air gaps while treating the upper edge 214 with abrasion may allow the perforations to be effective over a larger area. For example, the upper edge 214 of the honeycomb core 206 may be treated so that the upper edge 214 is roughened. When attached to the face sheet 202 by adhesive 218, small pathways created by the uneven surface, shown in FIG. 13A between the first layer of adhesive 1322 and the upper edge 1320 of the honeycomb core 1304, are maintained between the upper edge 214 of the honeycomb core 206 and the layer of adhesive 218. These pathways allow air to flow between the cells 208 upon expansion, thus equalizing pressure between the cells 208.

An internal pressure of the honeycomb core 206 may be reduced by exposing the cells 208 to vacuum, the low pressure transmitted to the cells 208 through the perforations in the top face sheet 202. When perforated, tiny apertures may extend through the thickness of the top face sheet 202 as well as the adhesive 218, fluidically coupling the cells 208 to air surrounding the honeycomb cores 206, thereby exposing the cells 208 to a negative pressure environment around the composite structure generated by a vacuum source. In other words, the internal pressure of the honeycomb core 206 is reduced enough before heating that the cells 208 remain under negative pressure even during heating. Thus, the internal pressure of the honeycomb core 206 is maintained low throughout a formation of a composite structure that includes the honeycomb core 206 and a tendency for the top face sheet 202 to lift off the honeycomb core 206 is reduced.

Roughening of the upper edge of the honeycomb core may be achieved by various techniques to produce an uneven, textured surface. One example of a tool that may be used to treat the upper edge of the honeycomb core is a sanding tool 500 shown in FIG. 5. The sanding tool 500 may have a circular outer shape and comprise a planar abrasive disc 502 attached to a flat face of a sanding pad 504. Surfaces of the sanding pad 504 not in contact with the abrasive disc 502 may all be curved. The sanding pad 504 may be formed from a piece of a dense foam and include a metal stem 506 securely coupled to a central region of the sanding pad and extending into a thickness 508 of the sanding pad 504. The stem 506 may be used to connect the sanding pad and attached abrasive disc 502 to a 3-axis CNC for machine sanding of the upper edge of the honeycomb core.

Figure 6:
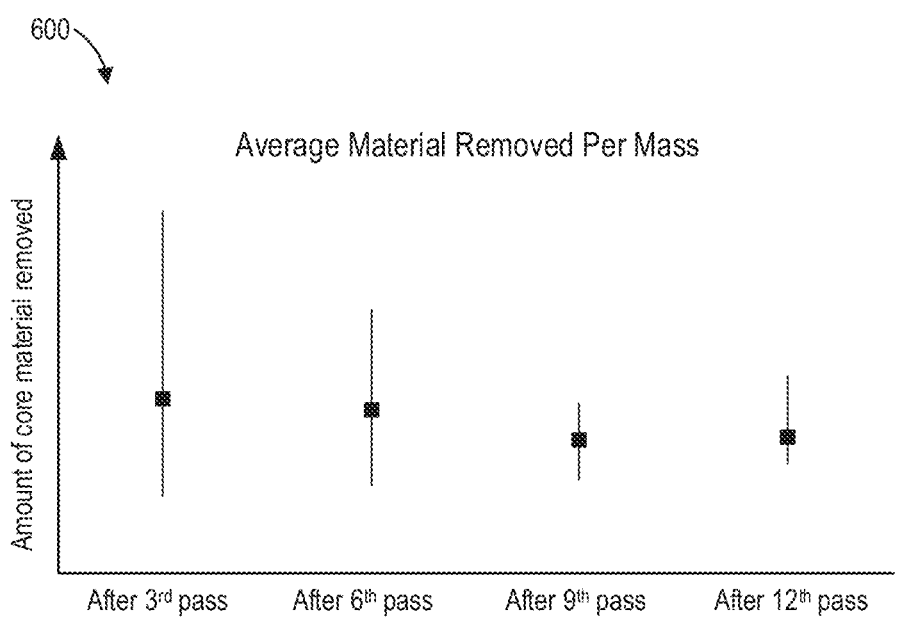
FIG. 6 shows a graph plotting an amount of material removed from a honeycomb core by machine sanding after a number of passes, error bars representing maximum and minimum measurements.

The amount of sanding applied to the honeycomb core may be adjusted based on a desired removal of material from the honeycomb core. For example, a graph 600 is shown in FIG. 6 showing results of machine-sanding of a honeycomb core by 3-axis CNC milling. An amount of material removed from the honeycomb core due to core abrasion is depicted relative to a number of passes conducted by the machine. A 600 in/min raster speed with 0.3 inch z-direction compression is used, sanding the honeycomb core with an abrasive disc, e.g., abrasive disc 502 of FIG. 5. The abrasive disc may be used to produce a coarse, uneven finish, rather than a smooth polished one, thus a coarse grit, such as 40 grit, may be employed.

Graph 600 shows that the amount of material removed decreases with number of passes applied to the honeycomb core until 9 passes have been completed. Little difference is shown between 9 passes versus 12 passes, indicating that removal by machine-sanding has reached a threshold, reducing the honeycomb core by 0.015 to 0.020 inches. Alternatively, the honeycomb core may be sanded by hand, using 80 grit paper coupled to a manual sanding block. The amount of material removed by hand, however, may be significantly more variable and less reproducible than by machine-sanding.

The amount of sanding applied to the upper edge of the honeycomb core, with respect to the upper edge 214 of the honeycomb core 206 of FIG. 2, may be adjusted to balance an amount of texturing of the upper edge with a sufficient surface area of the honeycomb core to bond securely to the top face sheet of the composite structure, e.g., the top face sheet 202 of the composite structure 250 of FIG. 2. A comparison of top edges of four panels of the honeycomb core, each sanded to varying degrees, is shown in a perspective view 700 of FIG. 7. The sanding may be achieved by either hand-sanding, machine-sanding, or some other technique for roughening a surface.

The four panels of honeycomb core include a first panel 702 that is not sanded. A second panel 704 is sanded by an amount that provides a desired balance between roughening of the upper edge and bonding to the top face sheet of the composite structure. The second panel 704 may be lighter in color than the first panel 702 due to removal of material from an upper edge of the honeycomb core of the second panel 704. A third panel 706 is a honeycomb core that is sanded more than the second panel 704. As a result of increased removal of material from an upper edge, the third panel 706 may lighter in color than both the first panel 702 and the second panel 704.

The third panel 706 may be sanded to an extent where the upper edge is highly textured and coarse. Due to the uneven texture of the upper edge of the third panel 706, the adhesive applied between the upper edge of the third panel 706 and the top face sheet of the composite structure may not bond a sufficient surface area of the upper edge of the honeycomb core to the downward-facing surface of the top face sheet. A strength of the composite structure may be reduced, resulting in the composite structure becoming less resistant to shear stresses.

A fourth panel 708 may be sanded less than either the third panel 706 or the second panel 704. The fourth panel 708 may be darker in color than the second panel 704 and third panel 706 but lighter than the first panel 702. The reduced amount of sanding of the fourth panel relative to the second panel 704 may allow the honeycomb core to bond securely to the top face sheet. The relatively smooth upper edge of the fourth panel, however, may not allow circulation and equalization of pressure between the cells of the honeycomb core. For example, vapors formed from volatiles generated during a chemical curing of a resin used to bond the composite structure may accumulate unevenly within individual cells of the honey core. Although the honeycomb may be placed under low pressure during heating, curing of the resin may seal perforations of the top face sheet. If the cells of the honeycomb core are not maintained in fluidic communication with one another, variations in internal pressures between the cells may allow some of the cells to have higher pressures than others. Confinement of vapors within individual cells may lead to non-uniform internal pressure within the cells during heating and increasing a likelihood that some cells may burst, forcing separating between components of the composite structure.

In other words, a significant temperature gradient may be present in the honeycomb core due in part to size and geometry. Heating during curing creates volatiles (arising from the chemical reactions in the resin as well as water turning into vapor). When the honeycomb core cells are under negative pressure, the volatiles may be absorbed by the vacuum generated when the cells are perforated and exposed to an external vacuum source. The internal pressure of the honeycomb core is negative throughout the cure cycle, removing opportunities for the face sheets to lift and disbond and/or delaminate. By texturizing the honeycomb core, gaps may be formed between an upper edge of the honeycomb and the top face sheet, allowing vapors to flow between cells and reducing pressure differentials between cells.

When the sanded honeycomb core is assembled between the top and bottom face sheets and secured with adhesive, the top face sheet may be perforated using a tool such as a puncturing tool 800, shown in FIG. 8. The puncturing tool 800 may be an elongate, rod-like device with a rotating disc 802 arranged at a first end 806 of the puncturing tool 800, the rotating disc 802 configured with pins 804 extending radially outwards around a perimeter of the rotating disc 802. The rotating disc may be formed from a metal or metal alloy with high tensile strength, such as steel, tungsten carbide, or titanium, and the pins 804 may be a length that allows the pins 804 to pierce through an entire thickness of a material. For example, the pins 804 may be 4 mm long so that the pins 804 may puncture through 6 plies of the material of the top face sheet (e.g., the top face sheet 202 of FIG. 2) as well as the layer of adhesive securing the top face sheet to the upper edge of the honeycomb core. However, it will be appreciated that the puncturing tool 800 shown in FIG. 8 is a non-limiting example and other lengths of the pins 804, thicknesses of the pins 804, diameter of the rotating disc 802, and number of pins 804 coupled to the rotating disc 802, may be desirable depending on a thickness of the top face sheet or geometry of the honeycomb core. The rotating disc 802 may rotate around a bolt 808, extending through a center of the rotating disc 802 and coupling the rotating disk 802 to a stem 810 of the puncturing tool 800.

The stem 810 may be a long, narrow piece of metal, such as stainless steel, that is curved to resemble an "S" rotated clockwise by 90 degrees. The stem 810 extends between the first end 806 of the puncturing tool 800 and a second end 812 of the puncturing tool 800 and couples the first end 806 to the second end 812. The second end 812 of the puncturing tool 800 may be a handle, formed from a plastic, rubber, or a composite material and may have a curved geometry, contoured to fit comfortably in a user's hand. Thus, the puncturing tool 800 may be a hand-held tool, gripped at the second end 812 and contacting an upward facing surface of the top face sheet of the composite structure (e.g., the composite structure 250 of FIG. 2) at the first end 806 of the puncturing tool 800. However, in other examples, the puncturing tool 800 may be adapted to be an automated, motorized device.

By exerting a downward force on the puncturing tool 800, the pins 804 of the puncturing tool 800 may pierce through the top face sheet and upper layer of adhesive of the composite structure. The puncturing tool 800 may be rolled in contact with and along the top face sheet, forming a trail of perforations according to a direction that the puncturing tool 800 is rolled. The perforations fluidically couple air inside the cells of the honeycomb core to air outside of the composite structure, providing channels through which air inside the cells may be evacuated by exposure to vacuum. When the air expands during a subsequent curing process, the increased volume of air is taken up by the vacuum (e.g., the pressure becomes less negative). Also, the air volume inside the honeycomb core is less when vacuum is applied, thus a mass of the expanding air is reduced. The amount of air aspirated out of the cells may be adjusted by varying the number of perforations formed in the top face sheet. For example, a 12 inch by 1 inch grid pattern of perforations on the face sheet may sufficiently release the air in the cells without affecting the structural integrity of the face sheet and composite structure.

The sanding of the upper edge of the honeycomb core and perforation of the top face sheet of the composite structure may allow pressure differentials between cells to be equalized and the perforations allow air to be drawn out of the cells, reducing cell pressure to below ambient pressure. Upon heating during curing, any residual air within the cells may expand but may still remain at a pressure below ambient pressure. A preparation of the composite structure for curing may include placing a panel of the composite structure, such as the panel 300 of FIG. 3, in a bag. The bag may be sealed and placed under vacuum at ambient temperature to draw air out of the composite structure and consolidate components of the composite structure. The bottom face sheet and honeycomb core may be bagged and vacuumed over several bagging and vacuuming cycles to remove air from the cells of the honeycomb core as layers of the composite structure, e.g., the top and bottom face sheets and sheets of adhesive, are added. The top and bottom face sheets may not be bonded, e.g., secured by adhesive, to the honeycomb core until the final heat cure is performed after the composite structure is fully laid up.

The bottom face sheet and honeycomb core may be removed from the bag to add the top face sheet to the upper edge of the honeycomb core, followed by bagging and vacuuming for another period of time. Perforations of the top face sheet may be conducted under a low pressure environment with subsequent application of active vacuum. The composite structure panel remains inside the bag under vacuum during the final curing step where the panel is placed in an oven and exposed to high temperatures to activate the cross-linking of polymer chains in a resin of the top and bottom face sheets. The curing step allows the resin in the top face sheet to seal the perforations closed, thus isolating the inner volume of the composite structure from the surrounding atmosphere.

If air is trapped within the cells of the honeycomb core, expansion of the trapped air during curing may generate an increase in pressure within the cells that leads to delamination of the composite structure. By sanding the upper edge of the honeycomb core cell-to-cell-transmission of air is allowed, equalizing pressure between cells. Perforating the top face sheet allows air in the cells of the honeycomb core to be removed during the bagging and vacuuming step, thus reducing a likelihood of delamination and disbonding during curing. An effectiveness of the core abrasion and perforation techniques are shown in a test comparing a control panel, a hand sanded panel, a machine-sanded panel with a high density spacing of perforations, and a machine-sanded panel with a low density spacing of perforations, in graph 900 of FIG. 9, graph 1000 of FIG. 10, graph 1100 of FIG. 11, and graph 1200 of FIG. 12, respectively.

The test may comprise drilling a hole through either the top face sheet or bottom face sheet to feed a thermocouple pressure transducer through the hole to measure a pressure of the air within the honeycomb core. The hole is sealed to block air flow through the hole. Pressure in the bag is similarly monitored. The thermocouple pressure transducer is active during the bagging and vacuuming process as well as the curing step where the composite panels are heated in an oven. Changes in pressure with temperature in the bagged control panel that has not been perforated or core sanded is depicted in graph 900 of FIG. 9.

Graph 900 includes an internal temperature of the control panel (plot 902), a temperature inside the bag and outside the panel (plot 904), an internal pressure of the honeycomb core of the composite structure (plot 906), and a pressure inside the bag and outside of the control panel (plot 908), all relative to time, in minutes. The temperature in the bag (plot 902) is ramped quickly to 180° F., between 0-51 min, and is held at a constant temperature until t=263 min. The temperature is ramped to 210° F. at t=264 min, and ramped again to 260° F. at t=350 min. The temperature is then held constant until t=508 in, ramped down thereafter. The temperature of the honeycomb core (plot 904) shows a similar profile.

The air inside the control panel is initially under vacuum, (e.g., below zero) and increases nonlinearly as the temperature rises until t=263 min. The pressure in the control panel reaches atmospheric pressure at t=263 min, and continues to rise above atmospheric. The increase in pressure occurs stepwise, the steps coinciding with the temperature ramps between 263-350 min until the temperature of the control panel reaches 265° F. The pressure is at a maximum at this point and decreases slightly while the temperature is maintained at 265° F. The pressure decreases quickly as the control panel cools. The pressure in the bag, and surrounding the control panel, remains low, and is relatively uniform over the duration of the test.

The rise of the pressure in the honeycomb core of the control panel above atmospheric level may be higher than a tolerance of the composite structure to inner pressure. For example, the adhesive may not maintain bonding between the face sheets and the honeycomb core when a pressure threshold is surpassed. The composite structure may experience delamination and treatment of the composite structure according to methods described above may be desirable. An example of results of such treatment is illustrated in graph 1000 of FIG. 10.

Figure 9:
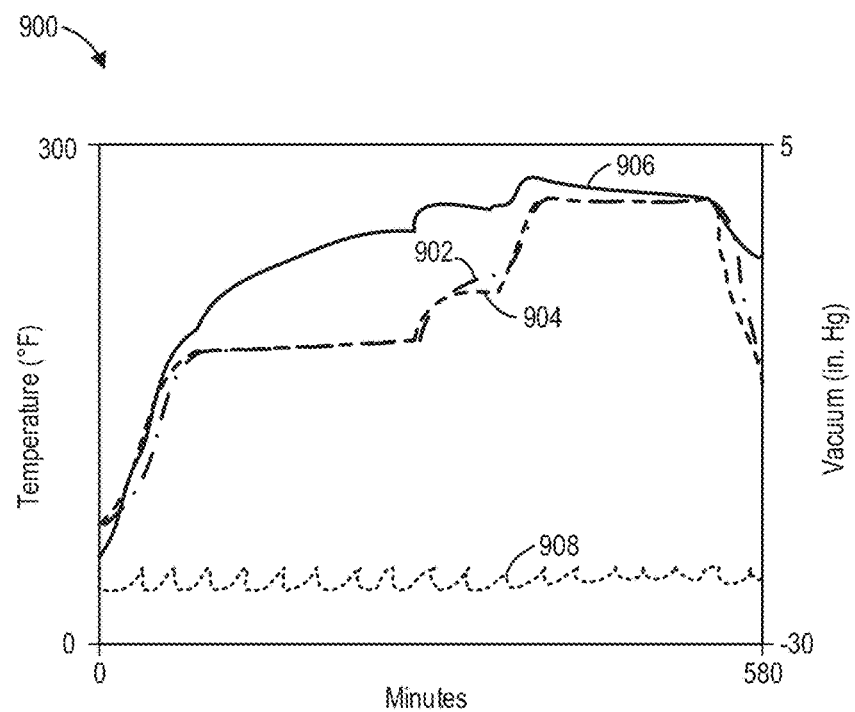
FIG. 9 shows a plot of temperature and pressure versus time for a control panel formed from a composite structure during curing in an oven.

Graph 1000 shows plots of temperature and pressure versus time for a composite panel with a honeycomb core that is hand-sanded and perforated with a tool such as the puncturing tool 800 of FIG. 8, followed by bagging and vacuuming the hand-sanded panel after assembly. The perforations are formed by a tool such as the puncturing tool 800 of FIG. 6, evenly distributing the perforations across a surface of top sheet of the composite panel and spaced four inches apart and four inches away from the thermocouple pressure transducer. An internal temperature of the hand-sanded panel is shown at plot 1002 and a temperature of the air inside the bag and outside of the panel is shown at plot 1004. The temperature profiles are similar to the temperature profiles of FIG. 9, showing analogous ramps and plateaus.

An internal pressure of the honeycomb core plot 1006 increases as temperature rises, more rapid increases coinciding with ramps in temperature. The change in pressure between 54-270 min, unlike plot 906 of FIG. 9, builds more gradually with a linear relationship between pressure and time. Also in contrast to plot 906 of FIG. 9, plot 1006 increases slightly between 344-507 min as the temperature is held constant at 265° F. to facilitate curing of a resin in the top and bottom face sheet. As the resin cures, the resin seals the perforations in the top of bottom face sheet as well as gaps in a sanded edge of the honeycomb core. The temperature reaches a maximum at 508 min before the heat is ramped down and pressure decreases. The pressure in the bag surrounding the hand-sanded panel remains lower than inside the panel and relatively uniform.

The pressure in the hand-sanded panel does not reach atmospheric pressure (e.g., zero) even when the pressure reaches the maximum. The vacuum initially created before the panel is heated acts as a reservoir and offsets the pressure increase. Thus, the honeycomb core remains under vacuum over the duration of the curing process. The results of the test shown in FIG. 10 indicates that the process of perforating the top or bottom face sheet and sanding the honeycomb core and subjecting the composite structure to vacuum prior to curing is able to lower an internal pressure of the honeycomb core enough to maintain the internal pressure of the honeycomb below atmospheric pressure throughout curing. An effect of core abrasion is further explored in test results shown in FIGS. 11 and 12.

Figure 11:
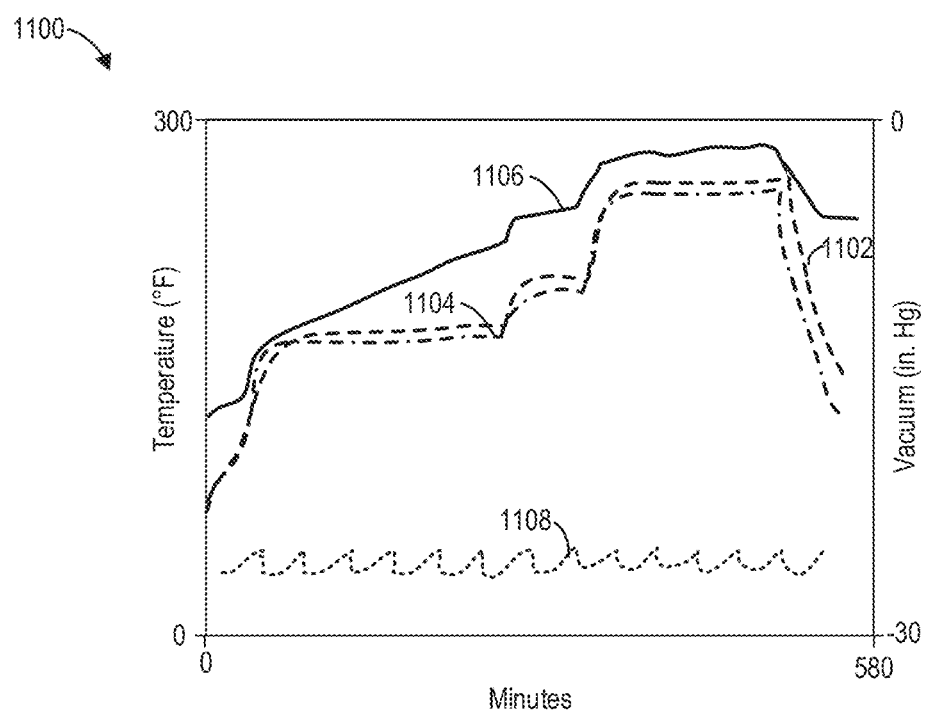
FIG. 11 shows a plot of temperature and pressure versus time during curing in an oven for a panel formed from a composite structure where a honeycomb core is machine-sanded and a top face sheet is adapted with perforations.
Figure 12:
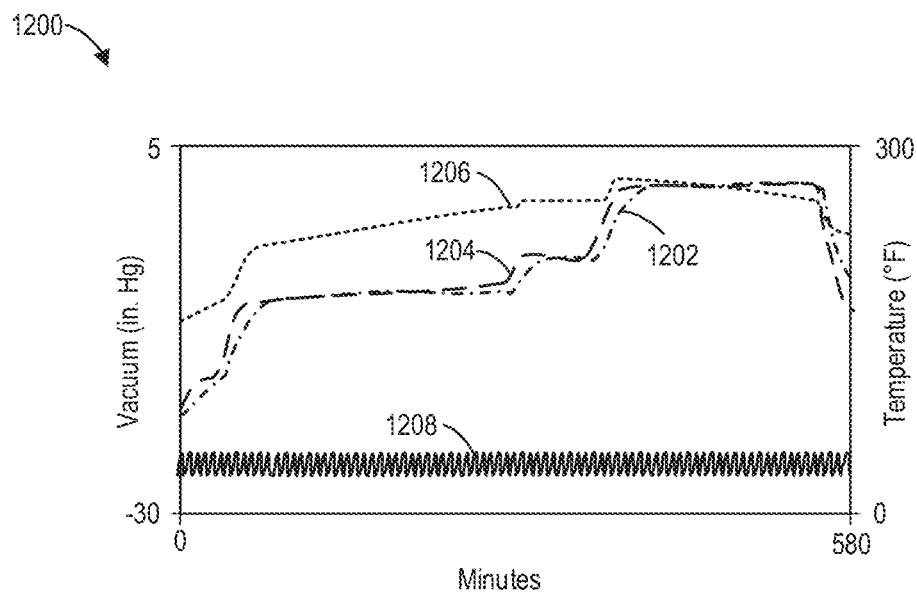
FIG. 12 shows a plot of temperature and pressure versus time during curing in an oven for a panel formed from a composite structure where a honeycomb core is machine-sanded and a top face sheet is adapted with low-density perforations.

Graphs 1100 and 1200 of FIGS. 11 and 12, respectively, also show plots of temperature and pressure versus time. Tested composite panels of FIGS. 11 and 12 include honeycomb cores that are machine-sanded prior to assembly of the composite structures and top face sheets of both composite structures are perforated. A top face sheet of FIG. 11 is perforated with apertures spaced 4 inches apart and the panel of FIG. 11 is hereafter referred to as a high-density perforated (HDP) panel. A top face sheet of the panel of FIG. 12 is perforated with apertures spaced 6 inches apart and the panel of FIG. 12 is hereafter referred to as a low-density perforated (LDP) panel. The HDP and LDP panels are bagged and vacuumed before exposure to heat for curing.

Graph 1100 comprises plot 1102 showing a temperature in the HDP panel, plot 1104 showing an air temperature inside a bag containing the HDP panel and outside the panel, plot 1106 showing an inner pressure of the honeycomb core, and plot 1108 showing a pressure inside the bag and external to the HDP panel. The temperature profiles 1102 and 1104 are similar to each other as well as to the temperature profiles of FIGS. 9 and 10.

Figure 10:
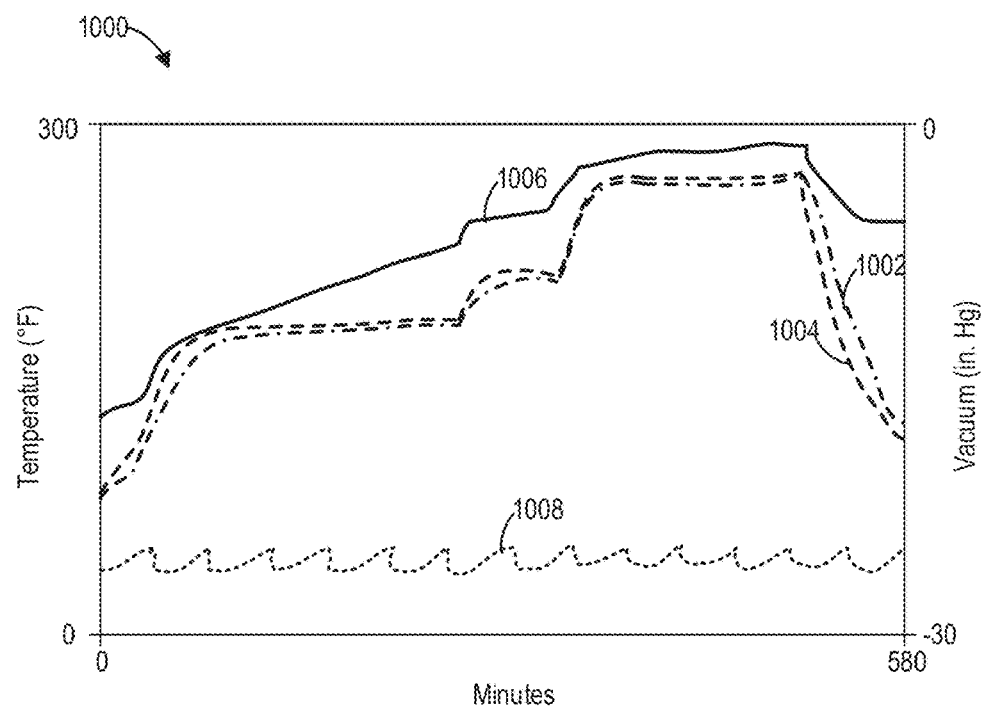
FIG. 10 shows a plot of temperature and pressure versus time during curing in an oven for a panel formed from a composite structure where a honeycomb core is hand-sanded and a top face sheet is adapted with perforations.

The pressure in the honeycomb core of the HDP panel (1106) closely resembles the pressure profile 1006 of FIG. 10, depicting similar increases in pressure with temperature rise. The pressure reaches a maximum at t=492 min that is comparable to the maximum temperature of plot 1006 of FIG. 10, remaining below atmospheric pressure. The similar results of the HDP panel of FIG. 11 to the hand-sanded panel of FIG. 10 indicates that machine-sanding or hand-sanding the honeycomb core provides comparable effects.

Graph 1200 comprises plot 1202 showing a temperature in the LDP panel, plot 1204 showing an air temperature inside a bag containing the LDP panel and outside the panel, plot 1206 showing an inner pressure of the honeycomb core, and plot 1208 showing a pressure inside the bag and external to the LDP panel. The temperature profiles 1202 and 1204 are similar to each other as well as the temperature profiles of FIGS. 9-11.

The pressure in the honeycomb core of the LDP panel (1206) begins under vacuum and, unlike plot 1106 of FIG. 1, increases nonlinearly between 40-267 min when the temperature is held at 180° F., instead displaying a curved rise. The pressure reaches atmospheric level at t=267 min when the temperature is 260° F. and subsequently increases above atmospheric pressure to a pressure similar to that of the control panel in plot 906 of FIG. 9.

The higher pressures generated within the honeycomb core of the LDP panel compared to the HDP panel indicates that 6 inch spacing of perforations in the top face sheet does not sufficiently allow aspiration of air from cells of the honeycomb core prior to heating. More densely spaced perforations, such as 4 inches spacing, may allow at least one perforation to be positioned above each cell of the honeycomb core to reduce cell pressure enough via exposure to vacuum to reduce a rise in pressure during curing resulting from expansion of residual air.

Figure 15:
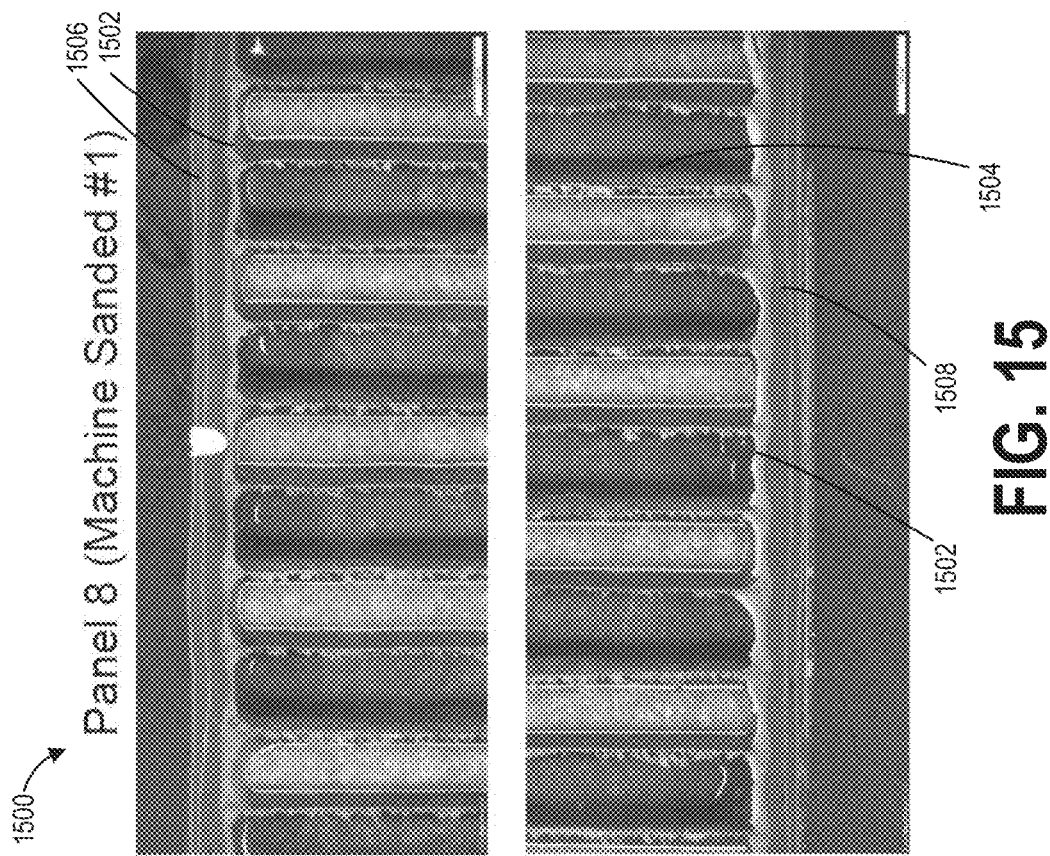
FIG. 15 shows a microscope image of a processed panel formed from a composite structure where a honeycomb core is machine-sanded and a top sheet is perforated.
Figure 14:
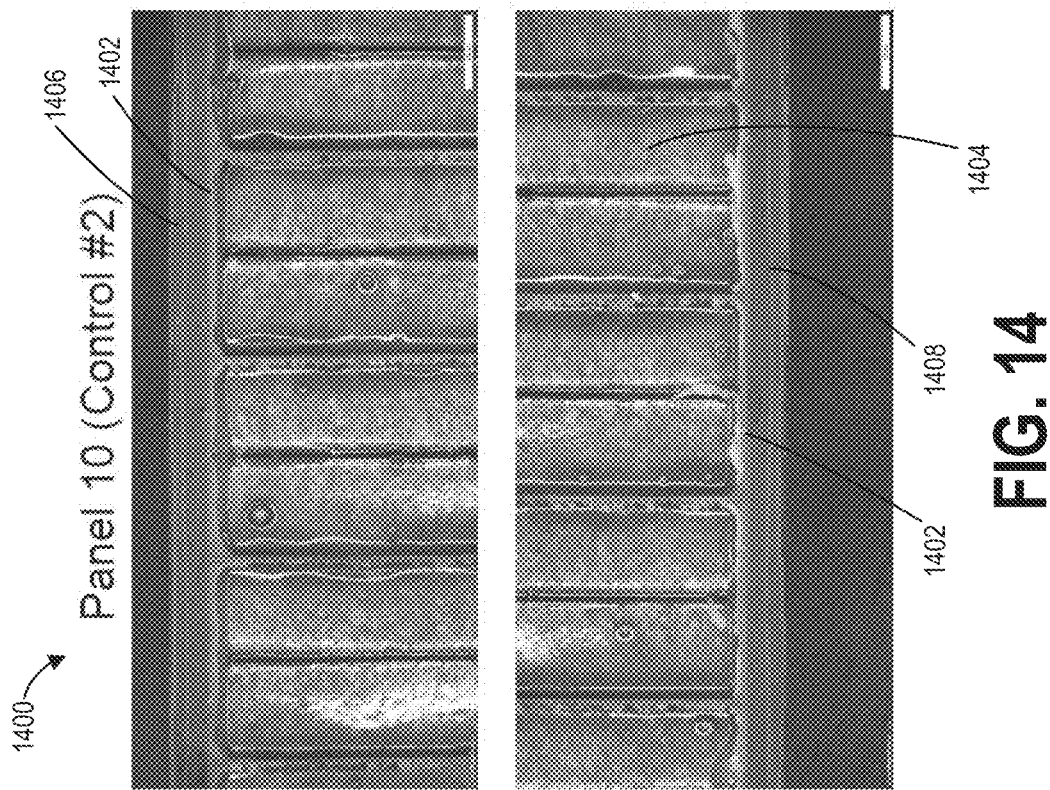
FIG. 14 shows a microscope image of a control panel formed from a composite structure.

A microscope image 1400 of the control panel that has not been sanded or perforated is provided in FIG. 14 and a microscope image 1500 of a machine-sanded and perforated panel is provided in FIG. 15. The image 1400 shows that adhesive layers 1402 of the control panel in the microscope image 1400 of FIG. 14 are smooth and continuous between a honeycomb core 1404 and a top face sheet 1406 and between the honeycomb core 1406 and a bottom face sheet 1408.

In the machine-sanded and perforated (e.g., treated) panel shown in the image 1500 of FIG. 15, adhesive layers 1502 between a honeycomb core 1504 and a top face sheet 1506 and between the honeycomb core 1504 and a bottom face sheet 1508 are similar to the adhesive layers 1402 of the control panel of FIG. 14. The adhesive layers 1502 of the treated panel are also continuous and smooth, indicating that the adhesive layers 1502 maintain adhesion between the honeycomb core 1504 and the top and bottom face sheets 1506, 1508 despite a rougher edge of the honeycomb core 1504 due to machine-sanding. Comparison of the adhesive layers of FIG. 14 and FIG. 15 suggest that sanding of the honeycomb core does not adversely affect cohesion of layers of a composite structure that has undergone sanding treatment.

Figure 16:
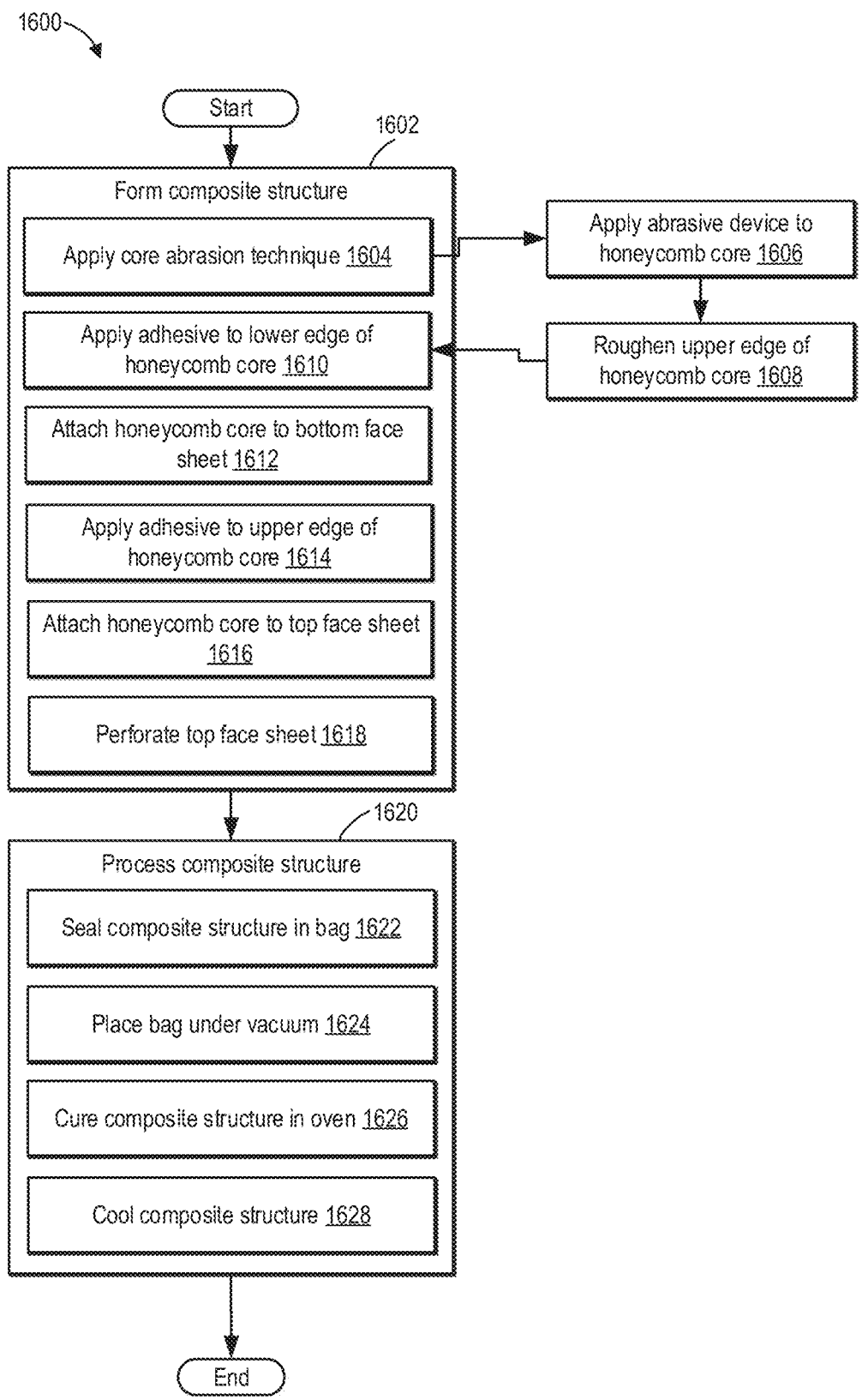
FIG. 16 shows an example of a routine for forming a thick core composite structure.

An example of a method 1600 for fabricating a composite structure, such as the composite structure 250 of FIG. 2 and 1302 of FIGS. 13A-13B, which may be used to form an aircraft fuselage is shown in FIG. 16. The composite structure includes a lightweight honeycomb core sandwiched between a top face sheet and a bottom face sheet. The top and bottom face sheets may be secured to opposite edges of the honeycomb core by layers of adhesive. The method 1600 describes a routine incorporating techniques to reduce a likelihood of delamination of the composite structure during a curing process that exposes the composite structure to high temperatures. By reducing the likelihood of delamination, manufacturing costs may be decreased and production throughput may be improved.

At 1602, the method includes forming the composite structure. Forming the composite structure may include applying a core abrasion technique at 1604. Applying the core abrasion technique may comprise using an abrasive device to roughen an upper edge of the honeycomb core. In one example, the abrasive device may be a sanding tool, such as the sanding tool 500 of FIG. 5. The sanding tool may have an abrasive disc attached to a foam sanding pad, configured with a connector to attach the sanding tool to a machine such as a 3-axis CNC mill. In another example, the abrasive device may be a manual sanding tool comprising coarse grit sand paper wrapped around a sanding block.

The method proceeds to 1608 to abrade the upper edge of the honeycomb core so that the upper edge has a rough texture. For example, the upper edge may be roughened using the sanding tool adapted with a 40 grit abrasive disc. The sanding tool may be coupled to a 3-axis CNC machine and configured to pass over the upper edge of the honeycomb core twelve times, as shown in FIG. 6. In other examples, more or less passes over the honeycomb core may be performed according to the coarseness of the abrasive disc and the settings of the 3-axis CNC. For example, using a coarser abrasive disc may result in conducting fewer passes to achieve an equivalent roughening of the honeycomb core or adjusting the 3-axis CNC to a higher raster speed may be balanced by less passes over the honeycomb core.

At 1610, the method continues the formation of the composite structure by applying a first layer of adhesive to a lower edge, on an opposite side of the honeycomb core from the upper edge, of the honeycomb core. An upward-facing surface of the bottom face sheet is coupled to the lower edge of the honeycomb core at 1612 by positioning the first layer of adhesive in face-sharing contact with the first layer of adhesive and pressing the bottom face sheet against the lower edge of the honeycomb core.

At 1614, forming the composite structure further includes applying a second layer of adhesive to the upper edge of the honeycomb core. The abrading of the upper edge of the honeycomb core may result in formation of small gaps between the second layer of adhesive and the upper edge. The gaps may allow air to flow between cells of the honeycomb core so that a pressure of each cell of the cells of the honeycomb core is similar to pressures of adjacent cells. The upper edge of the honeycomb core is bonded to a downward-facing surface of the top face sheet at 1616 by the second layer of adhesive, e.g., positioning the top face sheet in face-sharing contact with the second adhesive layer, and pressing the top face sheet against the upper edge of the honeycomb core.

At 1618, the method includes perforating the top face sheet of the composite structure. For example, a puncturing tool, such as the puncturing tool 800 of FIG. 8, may be rolled across an upwards-facing surface of the top face sheet while exerting downwards pressure on the surface. Pins of the puncturing tool may puncture through the top face sheet, leaving a trail of perforations with tiny diameters. The pins may be of a length that allows the pins to pierce through both an entire thickness of the top face sheet as well as the second layer of adhesive, thereby providing channels for air to flow between the cells of the honeycomb core and outside of the composite structure. A spacing of the pins along a rotating disc of the puncturing tool may be adapted to yield a desired density of perforations. For example, a density of perforations where the perforations are spaced 4 inches apart may provide a sufficient number of channels for air flow per cell of the honeycomb core to effectively aspirate air out of the cells prior to heating and maintain a pressure within the honeycomb core below an atmospheric level throughout a curing process.

The method proceeds to process the composite structure at 1620. Processing the composite structure may include sealing the composite structure in a bag, e.g., a plastic bag with high heat tolerance, at 1622. The bag may be adapted with a hose coupling an interior of the bag to a vacuum pump so that air may be pumped out of the bag and the composite structure placed under vacuum at 1624. The bag and the composite structure may be maintained under low pressure for a period of time, such as 12 hours, to allow air within the cells of the honeycomb structure to be removed via the perforations in the top face sheet of the composite structure. The composite structure may be exposed under multiple cycles of vacuum to remove as much air from the cells of the honeycomb structure as possible. As an example, each vacuum cycle may subject the honeycomb structure to progressively lower pressure, e.g., each successive cycle includes a stronger vacuum than a previous cycle.

Processing the composite structure may also include curing the composite structure in an oven at 1626, after drawing air out of the composite structure by vacuum. The composite structure, sealed in the bag under vacuum, may be heated in an oven to set resins in prepreg layers of the top and bottom face sheets. Curing the resins may activate cross-linking of polymer chains in the resins, increasing a tensile strength and rigidity of the top and bottom face sheets. As the resins cure during heating, the resins may become fluid and flow into the perforations of the top face sheet as well as gaps between the rough upper edge of the honeycomb structure and the downwards facing surface of the top face sheet. The perforations and gaps are sealed, blocking exchange between inner cell volumes of the honeycomb structure and air external to the composite structure as well as between the cells of the honeycomb structure. The composite structure may be exposed to temperatures up to 265° F. over a period of 500 min, as shown in FIGS. 9-12. However, other curing procedures may be used depending on a type of resin incorporated in the top and bottom face sheets.

When the curing time has elapsed, the composite structure is allowed to cool at 1628. As the composite structure cools, the resin hardens and become more rigid. A tensile strength of the composite structure increases and is maintained sealed so that the inner volume of composite structure is not in fluidic communication with the surrounding atmosphere.

In this way, a thick core composite structure, that may be used to form an aircraft fuselage, may be fabricated to reduce a likelihood of delamination and disbonding during a manufacturing process of the composite structure. The composite structure may comprise a honeycomb core sandwiched between a top face sheet and a bottom face sheet and coupled to the top and bottom face sheets with layers of adhesive. Treatment of the composite structure to decrease an occurrence of delamination may include roughening an upper edge of the honeycomb core that is adhered to the top face sheet and may further include perforating the top face sheet. The uneven, texture upper edge of the honeycomb core creates gaps between the upper edge and the layer of adhesive so that air may flow between inner cells of the honeycomb core, equalizing pressure between cells. The pressure in the honeycomb core may be maintained low relative to atmospheric pressure by allowing air to be evacuated through perforations in the top face sheet during a vacuum step to decrease an internal pressure of the composite structure. The composite structure thereby remains consolidated and intact throughout the manufacturing process.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for forming a composite structure for an aircraft, comprising:
   abrading an upper edge of a honeycomb core to form a rough, uneven edge of the honeycomb core;
   coupling the honeycomb core to a top face sheet and a bottom face sheet to form a sandwich structure, wherein coupling the honeycomb core to the top face sheet includes forming pathways between the upper edge and the top face sheet allowing air to flow between cells of the honeycomb core; and
   processing the sandwich structure to form a bonded structure.

2. The method of claim 1, wherein abrading the upper edge of the honeycomb core includes one of abrading the upper edge with a sanding tool coupled to a 3-axis CNC and abrading the upper edge manually with sand paper.

3. The method of claim 1, wherein processing the sandwich structure includes perforating the top face sheet with a puncturing tool.

4. The method of claim 1, further comprising forming and maintaining a reduced pressure in the honeycomb core during the processing.

5. A method for forming a composite structure for an aircraft, comprising:
   abrading an upper edge of a honeycomb core to form an uneven surface;
   coupling the honeycomb core to a top face sheet and a bottom face sheet to form a sandwich structure;
   perforating the top face sheet to fluidically couple air inside the sandwich structure to air outside of the sandwich structure; and
   processing the sandwich structure to form a bonded structure, wherein processing the sandwich structure includes placing the sandwich structure under vacuum and heating the sandwich structure.

6. The method of claim 5, wherein the vacuum is applied before the heating.

7. The method of claim 5, wherein the honeycomb core has an untreated bottom edge.

8. The method of claim 5, wherein placing the sandwich structure under vacuum and heating the sandwich structure includes placing the sandwich structure in an oven to cure resin in the top and bottom face sheets.

9. The method of claim 5, wherein perforating the top face sheet includes positioning at least one perforation of a plurality of perforations directly above each cell of the honeycomb core.

10. The method of claim 5, wherein perforating the top face sheet includes puncturing the top sheet using a puncturing tool and wherein the puncturing tool includes pins of a length sufficient to puncture entirely through a thickness of the top face sheet and a thickness of an adhesive coupling the honeycomb core to the top face sheet.

11. The method of claim 5, wherein perforating the top face sheet further includes adjusting an amount of air aspirated from the honeycomb core by varying a number of perforations formed in the top face sheet.

12. The method of claim 5, wherein perforating the top face sheet further includes perforating the top face sheet in a low pressure environment prior to placing the sandwich structure under vacuum.

13. The method of claim 5, wherein abrading the upper edge of the honeycomb core includes treating the upper edge with one of machine sanding and manual sanding.

14. A method for forming a composite structure for an airplane fuselage, comprising:
   abrading an upper edge of a honeycomb core to form an uneven surface;
   coupling the upper edge of the honeycomb core to a top face sheet to form pathways between the uneven surface of the upper edge of the honeycomb core and the top face sheet;
   coupling a bottom sheet to the honeycomb core to form a sandwich structure;
   exposing the sandwich structure to a vacuum where air flows along the pathways reducing the internal pressure of the honeycomb core; and
   heating the sandwich structure while maintaining a low internal pressure in the honeycomb core.

15. The method of claim 14, further comprising applying an adhesive between the honeycomb core and the top face sheet and bottom face sheet.

16. The method of claim 14, wherein a first portion of the upper edge of the honeycomb core is reduced by at least 0.015 inches from a second portion of the upper edge of the honeycomb core.

17. The method of claim 14, further comprising perforating the top face sheet prior to the heating.

18. The method of claim 14, further comprising sealing the sandwich structure.

* * * * *